July 4, 1950 — T. HEIL — 2,513,411
TRAILER TENT
Filed March 23, 1948
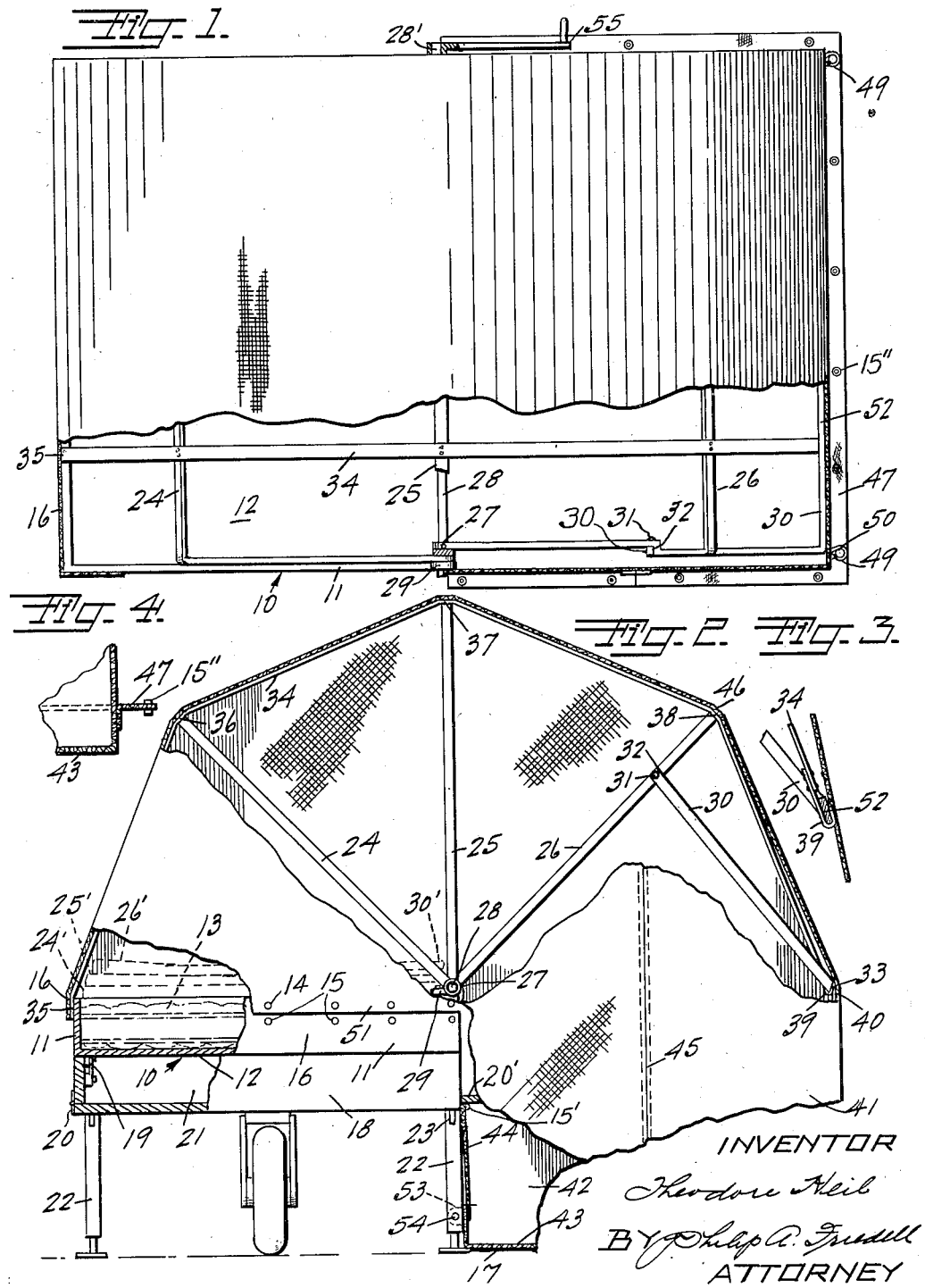
INVENTOR
Theodore Heil
BY Philip A. Fradell
ATTORNEY Patented July 4, 1950

2,513,411

UNITED STATES PATENT OFFICE 2,513,411

TRAILER TENT

Theodore Heil, Lodi, Calif.

Application March 23, 1948, Serial No. 16,520

6 Claims. (Cl. 135—4)

This invention relates to improvements in camp tents and particularly to tents in which a utility trailer selectively functions as a part of the tent, and provides a tent which is struck with a minimum of effort and in the shortest possible time, being moved to erected position by merely pulling in one element, and can be moved from a collapsed position to an erected position in about one second, thereafter merely requiring anchoring of the extension portion about the lower edge.

In addition, this tent has a floor portion which selectively functions as a floor for the erected tent and as a cover for the collapsed tent, being made to button about the sides of the bed frame or trailer body, so that no extra cover is required.

The tent can be mounted on a special frame made to releasably attach to the top of a utility trailer body, or directly on the trailer body, the separate frame being preferred as a bed can be kept made up at all times ready for use, and can be removed for separate use of the trailer, and where the tent is mounted on a separate frame which rests on the top of the trailer body, the trailer body can be made with hinged sides to form a storage compartment for food and camping, fishing and hunting equipment.

It therefore provides a tent in combination with a trailer, one which can be erected in an instant, and in which plenty of luggage space is provided and in which a bed can be kept in condition for use.

It provides a tent having twice the area of the support on which it is mounted, and folds back completely within the confines of the support, and provides its own cover.

The objects and advantages of the invention are as follows:

First, to provide a tent as outlined which is moved from a collapsed to an erected position merely by a pull exerted on a single support element.

Second, to provide a tent as outlined with a floor portion for the excess area and which floor portion functions as a cover for the collapsed tent.

Third, to provide a tent as outlined which can be erected or collapsed substantially in an instant.

Fourth, to provide a tent as outlined which utilizes a frame for one half the area of the tent with the other half extending beyond one side of the frame, and with the entire tent collapsible into the frame and thus requiring a minimum of space.

In describing the invention reference will be had to the accompanying drawings, in which:

Fig. 1 is a top plan view of the invention with a portion of the cover being cut away to show the interior construction.

Fig. 2 is a front elevation with portions of the cover cut away to show the interior construction.

Fig. 3 is an enlarged fragmentary view showing the releasable attachment of one of the belts on the side wall strut.

Fig. 4 shows the flange about the floor portion for use of the floor portion as a cover for the collapsed tent.

The invention includes a frame 10 having encompassing walls 11 including side walls, a front wall, and a back wall, and a bottom 12 for support of a bed 13 or the like therein, and having two sets of snap fasteners 14 and 15 one set of which serves for attaching the tent edges 16, and the other for attaching the floor portion 17 of the tent to the frame through the medium of the encompassing flange 47 which is preferably formed of the same material as the tent, when the floor portion is used as a cover for the remainder of the collapsed or folded tent.

Obviously the trailer body 18 can be used as the frame, though a separate frame is preferable because this frame is supported on top of the trailer body and secured thereto as indicated at 19, and with the trailer body having hinged sides as indicated at 20, therefore the space 21 can be used as a luggage space, easy of access, and capable of carrying all essential camp equipment, food, and hunting and fishing equipment, or, for laborers, tools and other equipment can be carried therein. Furthermore, with the removable frame, the tent in collapsed form can be lifted off the trailer to leave the trailer free for separate use.

The trailer is provided with adjustable legs 22 for firm support of the structure and which are collapsible or foldable against the underside of the trailer, being shown as hinged at 23.

The tent supporting structure includes a plurality of bows including a first bow 24, a central bow 25 and a lateral bow 26, the bows 24 and 25 being pivoted as indicated at 27 on a shaft 28 with the arms of the lateral bow 26 keyed thereon and which shaft is supported at its opposite ends in bearings 29 mounted on the ends of one side of the frame or trailer body, and the shaft is provided at one or both ends with a crank attaching end 28'. These bows have arms substantially equal in length to the width of the frame so that they fold down within the confines of the frame as indicated at 24', 25' and 26' when the tent is collapsed, or at least do not extend beyond the opposite side wall 11 of the frame.

A hip bow 30 has its arms pivoted, either inside or outside of the arms, to the lateral bow 26 as indicated at 31, the length of the arms of the bow 30 being equal to the distance from the pivotal point 31 to the shaft 28, and the arms 26 are provided with suitable stop means, such as the offset 32 formed in each arm 26 for cooperation with the bow 30 which limits the under and outward extension of the bow 30 to that necessary to form the hip 33 in line with the top of the wall 11 of the frame and equidistant from the center of the shaft 28 to provide a uniform outline for the tent.

Webs 34 have one end releasably attached to the one side wall 11 at 35 and fixedly attached to the lower edge 16 of the tent, and to the respective bows at 36, 37 and 38 and are provided with releasable attaching means 39 on the other end for attachment to the bow 30.

The tent is formed to fit over the spread bows with one side and part of each end wall terminating just below the top of the frame walls 11 and is attached thereto preferably by means of snap fasteners 14 or other suitable detachable means, though it can be permanently attached. However, if the tent frame is mounted directly on the trailer body, it would be advantageous to have the tent releasable therefrom.

Viewing the front end of the tent, Fig. 2, the extension side of the tent includes a side wall 40 and front and back wall drop extensions 41 and 42 (the front wall 41 being fragmentarily shown in Fig. 2) which terminate in a floor 43. A center wall 44 closes the space between the ground and trailer body from the front wall to the back wall and its upper end is releasably attached along the lower edge of the trailer body as shown at 15', forming a complete enclosure, and simultaneously providing access to the interior of the trailer body when the hinged drop door 20' is lowered as shown.

The front wall 41 is provided with a door such as a slit 45 with the edges securable together by means of a conventional slide fastener.

A flange 47 encompasses and extends outwardly from the floor portion 43 and is provided with securing elements 15'' for securing by the elements 15 on the frame when the floor portion is used as a cover for the collapsed and folded tent; and suitable grommets 49 are also provided in this flange for securing the lower edge of the depending extension side of the tent as by stakes or spikes 50 to anchor this lateral extension of the tent.

In collapsed position the bows 24, 25 and 26 are all folded down as indicated at 24', 25' and 26', and the bow 30 is folded back against the bow 26 as indicated at 30', with the tent collapsed therebetween and thereover; the frame supported portions 51 of the front and back walls, and the edge 16 being releasably secured to the top row 14 of snap fasteners. The floor portion or bottom section 17 extends over the entire tent with the flange 47 fastened all around to the lower series of snap fasteners 15, thus fully protecting the tent and contents of the frame and trailer body.

To erect the tent, the floor section serving as a cover is unsnapped, and the cross member 52 of the bow 30 is grasped and pulled away from the side of the trailer, or a hand crank 55 is attached to the wrench end 28' of the shaft 28 and operated to open the tent. This draws all of the bows to their erected positions, and simultaneously draws out the floor section. The catch 39 on the end of each web 34 is hooked over the cross member 52 which locks the tent in erected position. The floor section is dropped and a couple of stakes driven into the ground through the grommets 49, though ties may be used for the purpose of anchoring the bottom of the tent. The upper end of the center wall 44 can now be secured by the snap fasteners at 15' making a complete enclosure.

Obviously the tent can be supported in its entirety without resort to anchoring means by ears 53 which secure to the lower portions of the legs 22 forming a tension between the points 33 and 54 and between the legs 22 at the respective front and back ends of the trailer, under which conditions the tent is erected merely by pulling out on the cross member 52, or operating the crank 55, hooking the member 39 over the cross member 52 and fastening the ears 53. It takes only about one second to erect the tent after the cover has been released, and a few seconds additional to fasten the ears 53, and fastening of the ears is not even necessary if there is no wind or the floor next to the wall 40 is weighted, as the tent will maintain its erect position due to the weight of the overhanging portion and the pivotal support at the center of the tent.

I claim:

1. In a camp tent having a frame vehicularly supported, and having encompassing walls including side walls and front and back walls and a roof, a plurality of main bows including a lateral bow having each a cross member and having a common pivotal connection to one side wall of said frame, and spanning the length of the frame; tent hip supporting means comprising; a hip bow having its side arms pivotally connected to the side arms of said lateral bow intermediate the length thereof, flexible means for limiting the angular spacing of said main bows and attachable to the cross member of said hip bow to support said hip bow under tension from above substantially in the same plane as said common pivotal connection and including stop means cooperating between said lateral bow and said hip bow for limiting the under and outward swing of said hip bow, with said tent attached to the front and back walls and the other side wall of said frame and having a lateral extension supported by said lateral bow and including a hip supported by said hip bow, with said hip bow initially functioning as means for pulling the tent to erected position and thereafter as a support for the hip of the tent.

2. A structure as defined in claim 1; said tent having a drop extension from said lateral extension and including a floor section having an encompassing flange attachable over the top of the remainder of the tent and to the frame when the tent is collapsed to form a protective cover therefor.

3. A structure as defined in claim 2; said frame having two series of attaching means in two relative planes for releasable attachment respectively of the lower edge of the tent cover and for attachment of said flange to provide said protective cover.

4. In a camp tent having a vehicularly supported frame having a plurality of bows including a lateral bow and spanning the length of one side wall of the frame and pivotally supported thereon, and a hip bow having its arms pivotally connected intermediate the length of said lateral bow and stop means cooperating between said lateral bow and said hip bow for limiting the upward and outward extension of said hip bow to support the hip of the tent, said hip bow folding downwardly against said lateral bow during collapse of the tent and having its cross member located adjacent said one side wall and therefore being directly accessible for initially functioning as means for manually pulling said plurality of bows to an erected position and thereafter as a hip support for one side wall of the tent; and flexible connecting means connecting the other side of said tent and said bows for limiting the angular spread of the bows and being attachable at will to the hip bow for support in tent side-wall supporting position; said bows being foldable on said frame through detachment of said flexible connecting means from said hip bow followed by forcing of said hip bow toward the frame and folding the hip bow down on said lateral bow with its cross member along the pivotal support for the plurality of bows.

5. A structure as defined in claim 4; a tent cover having a lateral extension having a hip supported by said hip bow and including a drop extension including a floor section, with said floor section serving as a cover for the remainder of the tent when collapsed and folded on said frame and including an encompassing flange having securing means and projecting from the lower portion of said lateral extension for attaching the floor section over the remainder of the tent peripherally about the frame.

6. A tent comprising a frame including a vehicular support, a tent, three bows including a lateral bow and spanning the length of the frame and having their arms pivotally connected at the respective ends of one side of said frame; a hip bow having its arms pivotally connected to the arms of said lateral bow intermediate the length thereof and including stop means cooperative between said lateral bow and said hip bow for limiting the projection thereof in an upward and outward position, a flexible member connecting the other side of said frame and said three bows for equi-angular divergence and having an extension releasably attachable to said hip bow for support in extended position, with said hip bow having a cross member superposed on the pivotal ends of said three bows when folded and initially functioning as means for pulling said bows to an erected position, and upon attachment of said flexible member forming a hip support for one side of the tent, with said bows all collapsible within the confines of said frame through detachment of said flexible member from said hip bow, and pushing of the hip bow toward the frame.

THEODORE HEIL.

REFERENCES CITED

The following references are of record in the file of this patent:

FOREIGN PATENTS

| Number | Country | Date |
|---|---|---|
| 108,959 | Great Britain | Aug. 30, 1917 |
| 498,162 | Great Britain | Jan. 4, 1939 |
| 807,639 | France | Oct. 19, 1936 |